US012774813B2

(12) United States Patent
Swaby

(10) Patent No.: US 12,774,813 B2
(45) Date of Patent: Oct. 27, 2026

(54) GAS TURBINE ENGINE DUAL FUEL COMBUSTOR AND METHOD OF OPERATION

(71) Applicant: Pratt & Whitney Canada Corp., Longueuil (CA)

(72) Inventor: Nadia Swaby, York (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/972,193

(22) Filed: Dec. 6, 2024

(65) Prior Publication Data

US 2026/0160422 A1 Jun. 11, 2026

(51) Int. Cl.

| | |
|---|---|
| ***F23R 3/36*** | (2006.01) |
| ***F02C 9/40*** | (2006.01) |
| ***F23R 3/50*** | (2006.01) |
| *F02C 3/22* | (2006.01) |
| *F02C 3/24* | (2006.01) |

(52) U.S. Cl.

CPC .................. *F23R 3/36* (2013.01); *F02C 9/40* (2013.01); *F23R 3/50* (2013.01); *F02C 3/22* (2013.01); *F02C 3/24* (2013.01); *F05D 2220/323* (2013.01); *F05D 2240/35* (2013.01)

(58) Field of Classification Search

CPC ...... F23R 3/36; F23R 3/38; F23R 3/50; F02C 9/40; F02C 3/22; F02C 3/24; F05D 2220/323; F05D 2240/35

See application file for complete search history.

(56) References Cited

U.S. PATENT DOCUMENTS

| | | | | |
|---|---|---|---|---|
| 8,171,719 | B2 | 5/2012 | Ryan | |
| 8,490,406 | B2 * | 7/2013 | Dinu | F02C 9/40 60/776 |
| 9,874,148 | B2 | 1/2018 | Patel | |
| 2012/0240588 | A1 * | 9/2012 | Patel | F02C 9/26 60/745 |
| 2014/0318145 | A1 | 10/2014 | Patel | |
| 2016/0123579 | A1 | 5/2016 | Bridges | |
| 2023/0340915 | A1 * | 10/2023 | Speak | B64D 27/10 |
| 2025/0109853 | A1 * | 4/2025 | Naik | F23R 3/06 |
| 2025/0257875 | A1 | 8/2025 | Zelina | |

OTHER PUBLICATIONS

EP Search Report for EP Patent Application No. 25220575.2 dated Apr. 21, 2026.

* cited by examiner

*Primary Examiner* — Steven M Sutherland
(74) *Attorney, Agent, or Firm* — Getz Balich LLC

(57) ABSTRACT

A combustor for a gas turbine engine is provided that includes an annular combustor shell, a plurality of fuel nozzles, a rotary fuel slinger, and a plurality of first igniters. The annular combustor shell includes front and rear annular liners that collectively form the combustor shell and define a combustion chamber that includes inner and outer radial combustion zones. The fuel nozzles are engaged with the front annular liner and the outer radial combustion zone, and the fuel nozzles are configured to inject a first fuel. The rotary fuel slinger is engaged with the combustor shell and configured to deliver a second fuel into the inner radial combustion zone. The first fuel is a different type of fuel than the second fuel. The first igniters are engaged with the outer radial combustion zone and are configured to ignite the first fuel.

18 Claims, 3 Drawing Sheets

GAS TURBINE ENGINE DUAL FUEL COMBUSTOR AND METHOD OF OPERATION

BACKGROUND OF THE INVENTION

1. Technical Field

This disclosure relates to gas turbine engine combustors in general, and to systems and methods for combusting two different fuel types in the combustor in particular.

2. Background Information

Petroleum based fuels are the standard fuel for gas turbine engines in aviation applications. Combustion of petroleum based fuels produces undesirable carbon emissions. Zero-carbon fuels such as hydrogen and ammonia may also be combusted within a gas turbine engine and advantageously do not produce carbon emissions. What is needed is a gas turbine engine combustor, combustor system, and method of operation that realizes the benefits of both petroleum based fuels as well as zero-carbon fuels.

SUMMARY

According to an aspect of the present disclosure, a combustor for a gas turbine engine is provided that includes an annular combustor shell, a plurality of fuel nozzles, a rotary fuel slinger, and a plurality of first igniters. The annular combustor shell includes a front annular liner and a rear annular liner, wherein the front and rear annular liners collectively form the combustor shell and define a combustion chamber that includes an inner radial combustion zone and an outer radial combustion zone. The plurality of fuel nozzles are engaged with the front annular liner and the outer radial combustion zone, and the plurality of fuel nozzles are configured to inject a first fuel. The rotary fuel slinger is engaged with the combustor shell and configured to deliver a second fuel into the inner radial combustion zone. The first fuel is a different type of fuel than the second fuel. The plurality of first igniters are engaged with the outer radial combustion zone and configured to ignite the first fuel.

In any of the aspects or embodiments described above and herein, the first fuel may be a gaseous zero-carbon fuel, and the gaseous zero-carbon fuel may be gaseous hydrogen.

In any of the aspects or embodiments described above and herein, the rotary fuel slinger may be configured to transform a flow of second fuel in liquid form to a spray, wherein the spray of second fuel is delivered into the inner radial combustion zone.

In any of the aspects or embodiments described above and herein, the second fuel may be a liquid aviation fuel, and the liquid aviation fuel may be a kerosine-type fuel.

In any of the aspects or embodiments described above and herein, the combustor may include a plurality of second igniters engaged with the inner radial combustion zone and configured to ignite the second fuel.

According to an aspect of the present disclosure, a gas turbine engine for an aircraft is provided that includes a compressor section, a turbine section, a combustor, and a combustor fuel control system. The combustor includes an annular combustor shell, a plurality of fuel nozzles, a rotary fuel slinger, and a plurality of first igniters. The annular combustor shell includes a front annular liner and a rear annular liner. The front annular liner and the rear annular liner collectively form the combustor shell and define a combustion chamber that includes an inner radial combustion zone and an outer radial combustion zone. The plurality of fuel nozzles are engaged with the front annular liner and the outer radial combustion zone. The plurality of fuel nozzles are configured to inject a first fuel. The rotary fuel slinger is engaged with the combustor shell and configured to deliver a second fuel into the inner radial combustion zone. The first fuel is a different type of fuel than the second fuel. The first igniters are engaged with the outer radial combustion zone and configured to ignite the first fuel. The combustor fuel control system is configured to control delivery of the first fuel to the plurality of fuel nozzles and to control the delivery of the second fuel to the rotary fuel slinger.

In any of the aspects or embodiments described above and herein, the combustor fuel control system may be configured to operate in a first fuel delivery mode or a second fuel delivery mode one at a time.

In any of the aspects or embodiments described above and herein, the combustor fuel control system may include a controller in communication with a non-transitory memory storing instructions. The instructions when executed may cause the system controller to deliver the first fuel to the fuel nozzles or deliver the second fuel to the rotary fuel slinger based on a flight segment of an aircraft powered by the gas turbine engine.

In any of the aspects or embodiments described above and herein, the combustor fuel control system may include a controller in communication with a non-transitory memory storing instructions. The instructions when executed may cause the system controller to deliver the first fuel to the plurality of fuel nozzles or deliver the second fuel to the rotary fuel slinger based on a gas turbine engine emissions target.

In any of the aspects or embodiments described above and herein, the combustor fuel control system may include a controller in communication with a non-transitory memory storing instructions. The instructions when executed may cause the system controller to deliver the first fuel to the plurality of fuel nozzles or deliver the second fuel to the rotary fuel slinger based on one or more flight conditions associated with an aircraft powered by the gas turbine engine.

In any of the aspects or embodiments described above and herein, the combustor fuel control system combustor may be configured to permit manual switching between the first fuel delivery mode and the second fuel delivery mode.

According to an aspect of the present disclosure, a method of operating a gas turbine engine for an aircraft is provided. The gas turbine engine includes a compressor section, an annular combustor, and a turbine section. The annular combustor includes a combustion chamber having an inner radial combustion zone and an outer radial combustion zone. The method includes: controlling a flow of gaseous zero-carbon fuel to a plurality of fuel nozzles engaged with the outer radial combustion zone of the combustion chamber, and controlling a flow of liquid aviation fuel to a rotary fuel slinger engaged with the inner radial combustion zone of the combustion chamber. The step of controlling the flow of gaseous zero-carbon and the step of controlling the flow of liquid aviation fuel are coordinated so that the flow of gaseous zero-carbon fuel is provided to the plurality of fuel nozzles or the flow of liquid aviation fuel to the rotary fuel slinger.

In any of the aspects or embodiments described above and herein, the coordination of the step of controlling the flow of gaseous zero-carbon and the step of controlling the flow of liquid aviation fuel may be based on a flight segment of the aircraft powered by the gas turbine engine.

In any of the aspects or embodiments described above and herein, the coordination of the step of controlling the flow of gaseous zero-carbon and the step of controlling the flow of liquid aviation fuel may be based on a gas turbine engine emissions target.

In any of the aspects or embodiments described above and herein, the coordination of the step of controlling the flow of gaseous zero-carbon and the step of controlling the flow of liquid aviation fuel may be based on one or more flight conditions associated with the aircraft powered by the gas turbine engine.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
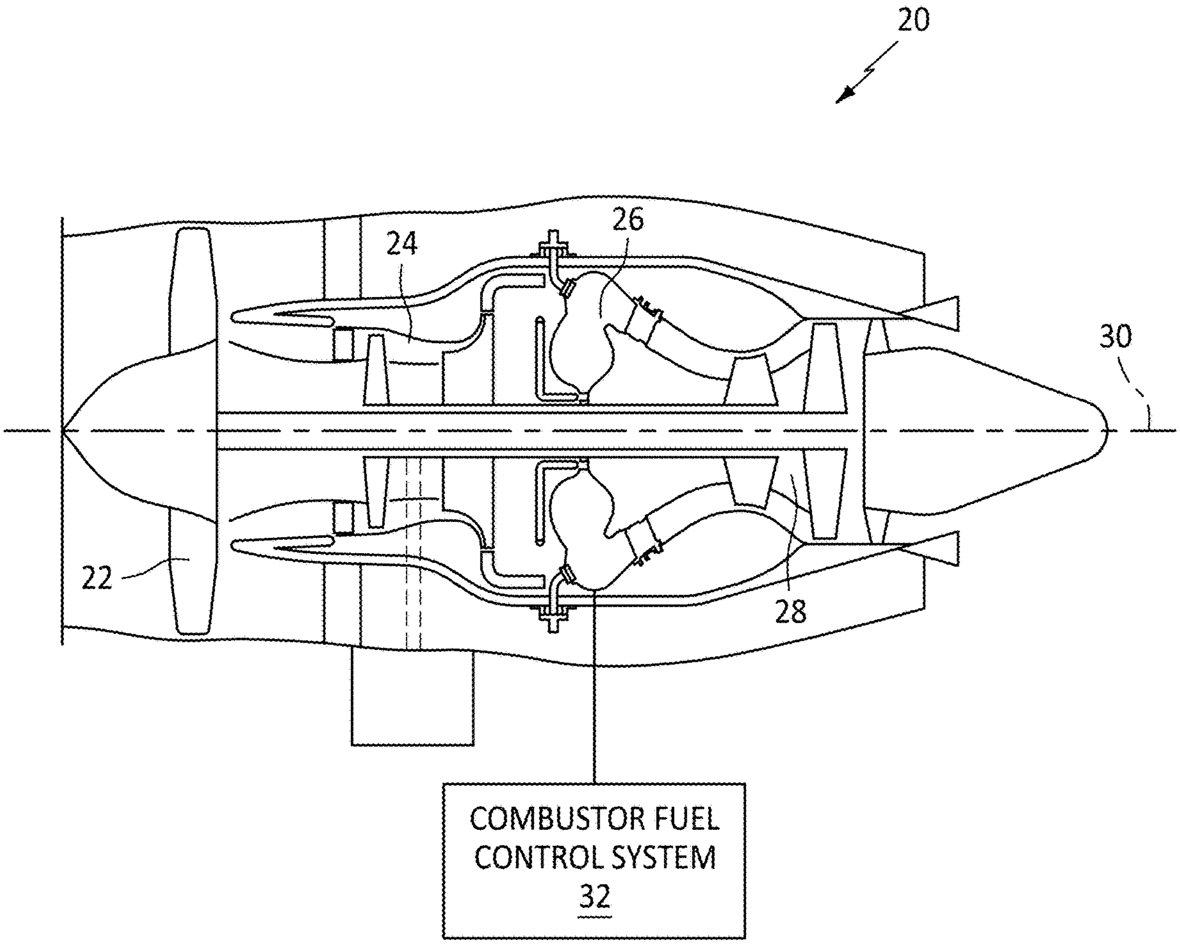
FIG. 1 is a diagrammatic representation view of a turbine engine.

FIG. 1 illustrates an example of a gas turbine engine 20 with which the present disclosure may be utilized. The gas turbine engine 20 includes a fan section 22, a compressor section 24, a combustor 26, a turbine section 28 disposed relative to an axial centerline 30, and a combustor fuel control system 32.

Figure 2:
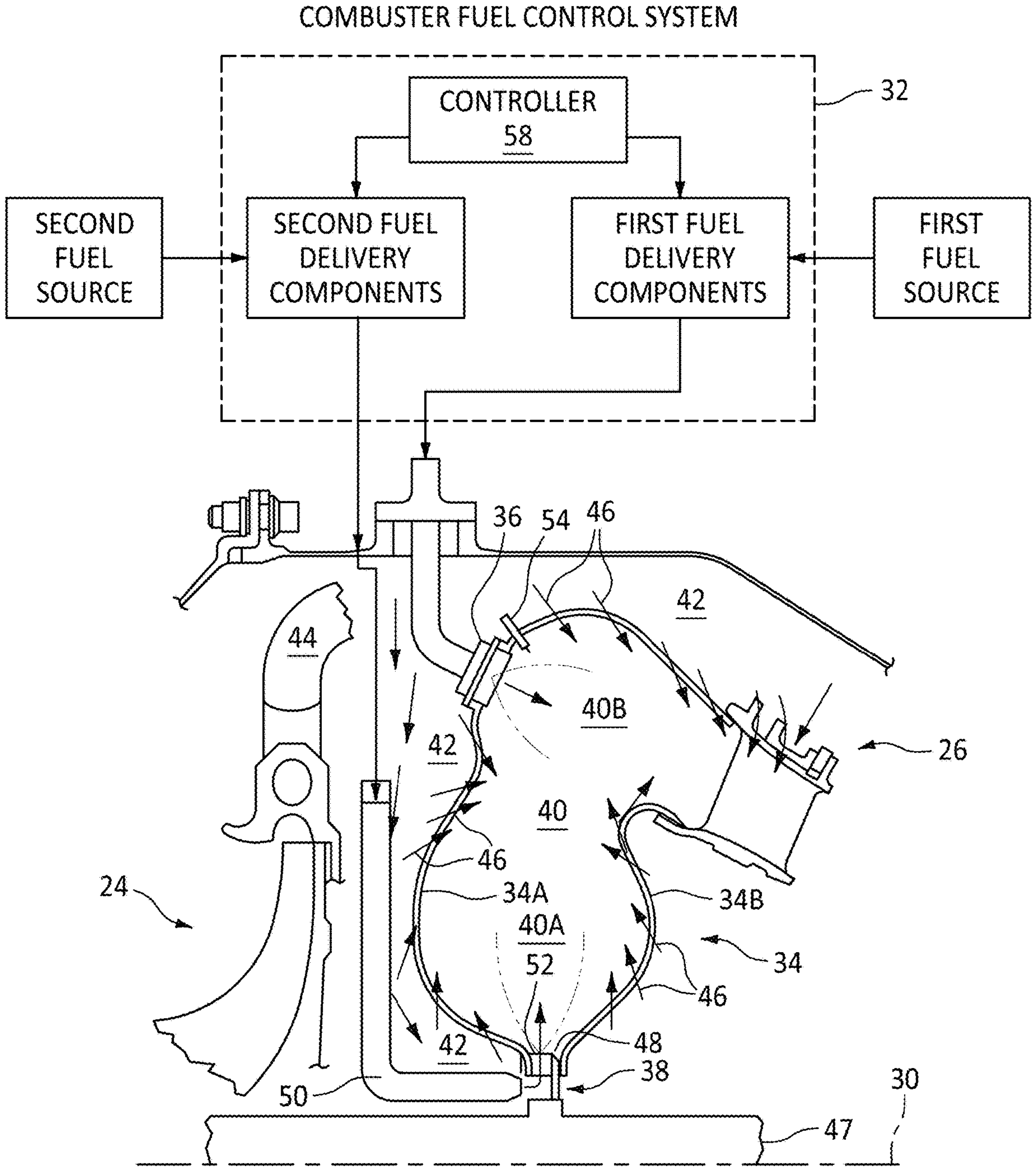
FIG. 2 is a diagrammatic representation of a present disclosure combustor and combustor fuel control system embodiment.

Referring to FIG. 2, the combustor 26 includes an annular combustor shell 34, a plurality of fuel nozzles 36, and a rotary fuel slinger 38. The combustor shell 34 includes a front annular liner 34A and a rear annular liner 34B. The front and rear annular liners 34A, 34B collectively form the combustor shell 34 and are spaced apart from one another to define an interior region of the combustor 26 referred to hereinafter as the combustion chamber 40. The combustor 26 is disposed in a plenum 42 that is supplied with compressed air from the compressor section 24; e.g., from a compressor diffuser 44. The front and rear annular liners 34A, 34B may include a plurality of air inlet apertures configured to allow air flow from the plenum 42 into the combustion chamber 40. Arrows 46 are used to diagrammatically illustrate the air inlet apertures and the air flow from the plenum 42 and into the combustion chamber 40. In some embodiments, the front and rear annular liners 34A, 34B may also include cooling structure such as effusion cooling holes (not shown) to provide cooling to the front and rear annular liners 34A, 34B. The combustion chamber 40 may be described as having an inner radial combustion zone 40A and an outer radial combustion zone 40B.

The plurality of fuel nozzles 36 are individual units that are circumferentially distributed about the annular combustion chamber 40 and are disposed contiguous with the outer radial combustion zone 40B of the combustion chamber 40. The fuel nozzles 36 extend in respective openings defined in the front annular liner 34A of the combustor shell 34 and are configured to inject a first type of fuel ("first fuel") into the outer radial combustion zone 40B of the combustion chamber 40. The first fuel may be supplied to the fuel nozzles 36 from a first fuel source via any appropriate first fuel supply structure. The fuel nozzles 36 may be circumferentially distributed about the annular combustion chamber 40 in a uniform arrangement; i.e., uniform spacing between fuel nozzles 36 around the circumference of the annular combustion chamber 40. The fuel nozzles 36 may be disposed generally downstream of the rotary fuel slinger 38 relative to the flow of combustion gases through the combustion chamber 40.

Figure 3:
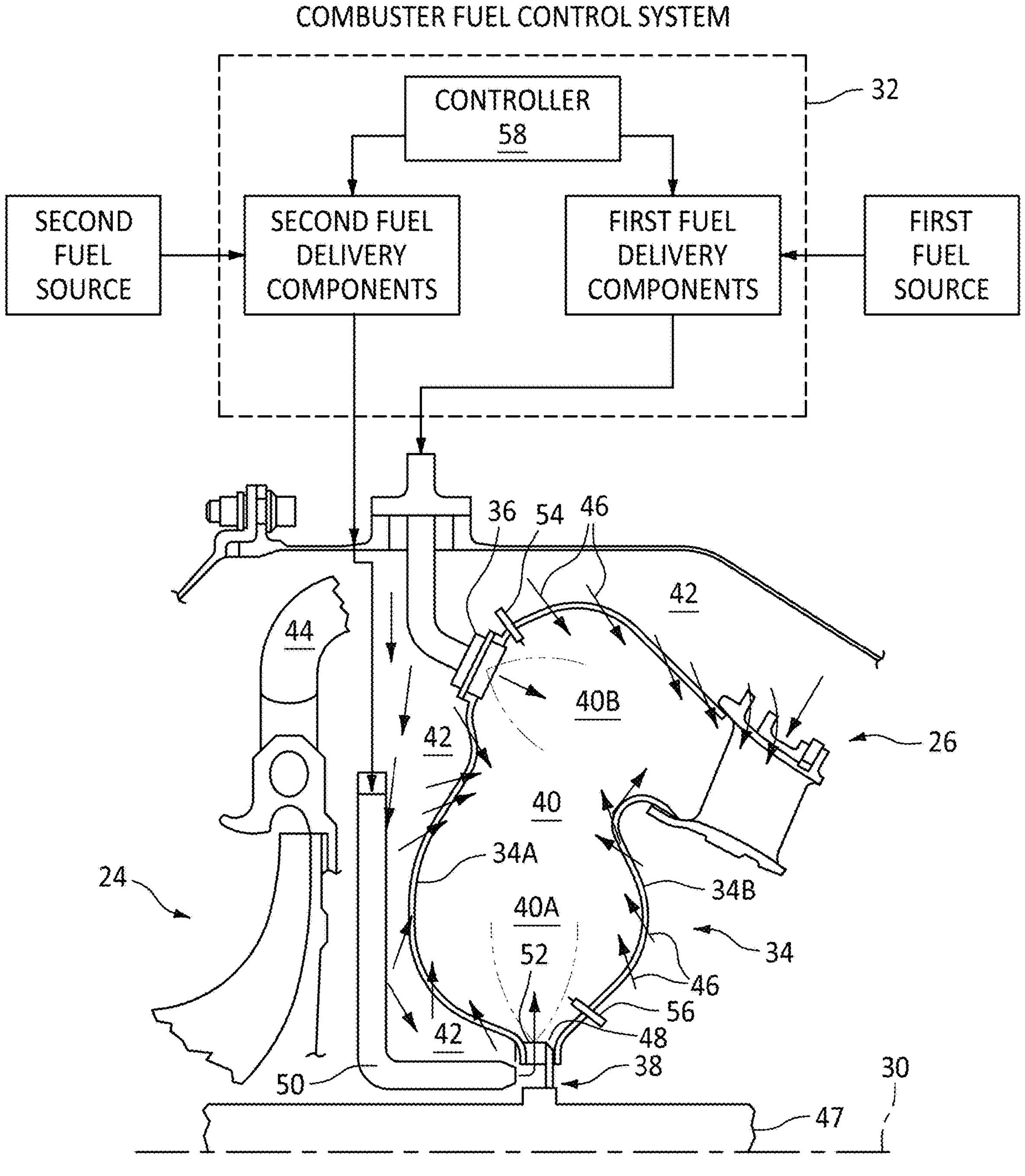
FIG. 3 is a diagrammatic representation of a present disclosure combustor and combustor fuel control system embodiment.

The rotary fuel slinger 38 is mounted for rotation with an engine shaft 47 that is coupled to the compressor section 24 or to a turbine section 28 rotor. The rotary fuel slinger 38 is axially aligned with an inner radial circumferential opening 48 defined in the annular combustor shell 34. The inner radial circumferential opening 48 is contiguous with the inner radial combustion zone 40A of the combustion chamber 40. The rotary fuel slinger 38 is configured to produce a spray of a second type of fuel ("second fuel") into the inner radial combustion zone 40A of the combustion chamber 40. FIGS. 2 and 3 show a second fuel manifold 50 that extends into the plenum 42 for directing a flow of second fuel from a second fuel source (not shown) to the rotary fuel slinger 38. As the rotary fuel slinger 38 rotates, second fuel is centrifuged through outlet holes 52 defined in the rotary fuel slinger 38, thereby atomizing the second fuel into tiny droplets and distributing the second fuel into the inner radial combustion zone 40A of the combustion chamber 40. Hence, the second fuel delivered to the rotary fuel slinger 38 in liquid form passes radially outwardly from the inner radial circumferential opening 48 in a spray form.

Referring to FIG. 2, a plurality of first igniters 54 are disposed adjacent the fuel nozzles 36. The first igniters 54 are operable to ignite the first fuel. In some embodiments, the first igniters 54 may be configured to ignite the first fuel supplied by fuel nozzles 36 and the second fuel supplied by the rotary fuel slinger 38. In some embodiments (e.g., see FIG. 3), the combustor 26 may include the first igniters 54 disposed adjacent the fuel nozzles 36 and a plurality of second igniters 56 disposed adjacent the rotary fuel slinger 38. The second igniters 56 are configured to ignite the second fuel supplied by the rotary fuel slinger 38.

The combustor fuel control system 32 is configured to control the delivery of the first fuel to the fuel nozzles 36 and to control the delivery of the second fuel to the rotary fuel slinger 38. The first fuel may be hydrogen or a hydrogen-ammonia mixture in gaseous form. The first fuel may be stored in liquid or gaseous form within the first fuel source. The second fuel may be a liquid fuel such as conventional jet fuel (e.g., a kerosine-type fuel like jet A, jet A-1, jet B—i.e., a petroleum distillate), kerosine, diesel, sustainable aviation fuels (SAFs), or the like. The second fuel may be stored in liquid form within the second fuel source. Hence, the combustor 26 and combustor fuel control system 32 may be described as a dual fuel system.

The combustor fuel control system 32 is configured to selectively deliver the gaseous first fuel (e.g., hydrogen) to the fuel nozzles 36 (i.e., a first fuel delivery mode) or deliver the liquid second fuel (e.g., jet-A) to the rotary fuel slinger 38 (i.e., a second fuel delivery mode). With the exception of a transition period, the combustor fuel control system 32 is configured to deliver only the gaseous first fuel to the fuel nozzles 36 or only the liquid second fuel to the rotary fuel slinger 38; i.e., the combustor fuel control system 32 does not operate in the first fuel delivery mode and the second fuel delivery mode at the same time. During a transition period (i.e., wherein the system 32 transitions from delivering the first fuel to fuel nozzles 36 to delivering the second liquid fuel to the rotary fuel slinger 38, or vice versa), the combustor fuel control system 32 may decreasingly taper the first fuel volumetric flow rate (i.e., shut down the first fuel delivery mode) and increasingly taper the second fuel volumetric flow rate (i.e., turn on the second fuel delivery mode), or vice versa, to permit continuous fuel combustion during the transition. Residual fuel in the delivery system of the first fuel may be injected into the combustor 26 until the residual first fuel runs out while at the same time the volumetric flow rate of the second fuel ramps up from a zero volumetric flow rate to a desired fuel flow rate. Either way, both the first fuel and the second fuel may be supplied to the combustor 26, but only during the transition period. The combustor fuel control system 32 may include fluid handling components (e.g., "delivery components" such as valves, manifolds, turboexpanders, pumps, and the like) configured to deliver the first fuel from the first fuel source to the fuel nozzles 36, and to deliver the second fuel from the second fuel source to the rotary fuel slinger 38. The present disclosure is not limited to any particular types of delivery components or combinations of delivery components for delivering the first fuel to the to the fuel nozzles 36, or for delivering the second fuel to the rotary fuel slinger 38.

The combustor fuel control system 32 may include a controller 58 for automated control of the first fuel and second fuel delivery components, or the delivery components may be configured for manual operation, or some combination of automated control and manual control. The term "controller" as used herein refers to a device that may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable combustor fuel control system 32 (or a system component) to accomplish the same algorithmically and/or coordination of system components. The controller 58 may include or may be in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. The controller 58 is shown in FIGS. 2 and 3 and described herein as an independent component to facilitate the description. The controller 58 may alternatively be integrated within another controller present with the gas turbine engine 20 (or aircraft) and that controller may be configured to perform the functionality detailed herein. The present disclosure is not limited to any particular controller architecture unless specifically stated herein. The controller 58 and/or other combustor fuel control system 32 components may be in communication with input devices (e.g., system control inputs such as operator switches, sensors, and the like) and with output devices (e.g., gauges and the like) that provide system information to the aircraft operator and/or allow the aircraft operator to enter commands into the system.

The present disclosure combustor fuel control system 32 may be configured to combust one of the first fuel or the second fuel during certain flight segments (e.g., idle, taxiing, take-off, ascent, cruise, descent, or the like) and to combust the other of the first fuel or the second fuel during other flight segments. Conventional aviation fuels combusted within a gas turbine engine 20 provide desirable amounts of power when combusted but typically produce undesirable carbon emissions (e.g., CO2) during the combustion. Zero-carbon fuels such as hydrogen and ammonia may provide less power when combusted but provide an attractive zero-carbon emission alternative to conventional fuels that produce carbon emissions.

In an automated embodiment of the present disclosure system, the present disclosure combustor fuel control system 32 may be configured to control the combustor 26 such that the combustion of first fuel or second fuel is based on preexisting parameters. For example, the present disclosure combustor fuel control system 32 may be configured to control the combustor 26 such that first fuel (e.g., zero-carbon fuels such as hydrogen, ammonia, or a combination thereof) is combusted during certain flight segments (e.g., a cruise segment) of the aircraft and second fuel (e.g., conventional jet fuels such as jet A-1, kerosine, diesel, SAFs, or the like) is combusted during certain flight segments (e.g., take-off and ascent segments). Conventional aviation fuel (via the rotary fuel slinger 38) may be combusted during flight segments where more power or maximum power is required (e.g., take-off and ascent) and zero-carbon fuels (e.g., hydrogen, ammonia, or combinations thereof via the fuel nozzles 36) may be combusted during other flight segments (e.g., cruise) when less power is required. In this manner, the present disclosure combustor fuel control system 32 and combustor 26 can be used to appreciably decrease the carbon emissions produced during the flight of an aircraft and still provide the requisite propulsion power required for the flight segment at hand. As another example, the present disclosure combustor fuel control system 32 may be configured to control the combustor 26 to combust first fuel during certain flight segments and second fuel during other flight segments to arrive at a predetermined emissions target (e.g., a carbon emissions target) for the particular flight. As another example, the present disclosure combustor fuel control system 32 may be configured to control the combustor 26 to combust first fuel or second fuel based on flight conditions such as ambient temperature, altitude, air speed, head winds, or the like. When the gas turbine engine 20 is operating in flight conditions that are favorable to the first fuel combustion, then the present disclosure combustor fuel control system 32 may be configured to control the combustor 26 to combust first fuel. Conversely, when the gas turbine engine 20 is operating in flight conditions that are favorable to the second fuel combustion (or conversely, flight conditions that are adverse to first fuel combustion), then the present disclosure combustor fuel control system 32 may be configured to control the combustor 26 to combust second fuel. The flight conditions may be determined by sensors, or determined algorithmically, or any combination thereof. As another example, the present disclosure combustor fuel control system 32 may be configured to determine remaining levels of stored first fuel and stored second fuel. The system 32 may be configured to automatically switch from the first fuel to the second fuel if the remaining level of first fuel is insufficient, or conversely switch from the second fuel to the first fuel if the remaining level of second fuel is insufficient.

As indicated above, embodiments of the present disclosure combustor fuel control system 32 may be configured to permit manual control; e.g., by the operator of the aircraft. For example, the present disclosure combustor fuel control system 32 may be configured such that second fuel (e.g., conventional jet fuel) is the default fuel for combustion. When a flight segment (e.g., cruise segment) is achieved that is amenable to first fuel (e.g., a zero-carbon fuel) combustion, the operator of the aircraft may have the option of manually switching combustion from the second fuel to the first fuel. Embodiments of the present disclosure combustor fuel control system 32 may be configured to include some combination of automated control and manual control. For example, if the aircraft operator has manually switched combustion to the first fuel (e.g., a zero-carbon fuel) and flight conditions change (e.g., ambient temperature, altitude, or the like) thereafter to conditions more favorable for second fuel combustion (or conversely, flight conditions that are adverse to first fuel combustion), the present disclosure combustor fuel control system 32 may be configured to automatically revert to combustion of second fuel (e.g., conventional jet fuel). The present disclosure combustor fuel control system 32 is not limited to any particular automated control configuration, or manual control configuration, or hybrid automatic/manual control configuration. Regardless of whether the present disclosure combustor fuel control system 32 is configured for automated, manual, or hybrid automatic/manual control, the present disclosure combustor fuel control system 32 may include safety controls (e.g., logic controls, sensor input, or the like) configured to ensure safe operation of the gas turbine engine 20 combusting first fuel or second fuel.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc. The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A combustor for a gas turbine engine, comprising:

an annular combustor shell that includes a front annular liner and a rear annular liner, wherein the front annular liner and the rear annular liner collectively form the combustor shell and define a combustion chamber that includes an inner radial combustion zone and an outer radial combustion zone;

a plurality of fuel nozzles engaged with the front annular liner and the outer radial combustion zone, wherein the plurality of fuel nozzles are configured to inject a first fuel;

a rotary fuel slinger engaged with the combustor shell and configured to deliver a second fuel into the inner radial combustion zone;

wherein the first fuel is a different type of fuel than the second fuel;

a plurality of first igniters engaged with the outer radial combustion zone and configured to ignite the first fuel; and a combustor fuel control system including a controller in communication with a non-transitory memory storing instructions, which instructions when executed cause the controller to selectively deliver the first fuel to the plurality of fuel nozzles in a first fuel delivery mode, or deliver the second fuel to the rotary fuel slinger in a second fuel delivery mode, based on a predetermined carbon emissions target for the gas turbine engine.

2. The combustor of claim 1, wherein the first fuel is a gaseous zero-carbon fuel.

3. The combustor of claim 2, wherein the gaseous zero-carbon fuel is gaseous hydrogen.

4. The combustor of claim 1, wherein the rotary fuel slinger is configured to transform a flow of second fuel in liquid form to a spray, wherein the spray of second fuel is delivered into the inner radial combustion zone.

5. The combustor of claim 4, wherein the second fuel is a liquid aviation fuel.

6. The combustor of claim 5, wherein the liquid aviation fuel is a kerosene-type fuel.

7. The combustor of claim 1, further comprising a plurality of second igniters engaged with the inner radial combustion zone and configured to ignite the second fuel.

8. A gas turbine engine for an aircraft, comprising:

a compressor section;

a turbine section; and a combustor that includes:

an annular combustor shell that includes a front annular liner and a rear annular liner, wherein the front annular liner and the rear annular liner collectively form the combustor shell and define a combustion chamber that includes an inner radial combustion zone and an outer radial combustion zone;

a plurality of fuel nozzles engaged with the front annular liner and the outer radial combustion zone, wherein the plurality of fuel nozzles are configured to inject a first fuel;

a rotary fuel slinger engaged with the combustor shell and configured to deliver a second fuel into the inner radial combustion zone;

wherein the first fuel is a different type of fuel than the second fuel;

a plurality of first igniters engaged with the outer radial combustion zone and configured to ignite the first fuel; and a combustor fuel control system that is configured to control delivery of the first fuel to the plurality of fuel nozzles and to control the delivery of the second fuel to the rotary fuel slinger wherein the combustor fuel control system is configured for manual operation by an operator of the aircraft to permit operator-initiated manual switching between a first fuel delivery mode of the first fuel and a second fuel delivery mode of the second fuel.

9. The gas turbine engine of claim 8, wherein the first fuel is a gaseous zero-carbon fuel and the second fuel is a liquid aviation fuel.

10. The gas turbine engine of claim 9, wherein the gaseous zero-carbon fuel is gaseous hydrogen.

11. The gas turbine engine of claim 9, further comprising a plurality of second igniters engaged with the inner radial combustion zone and configured to ignite the second fuel.

12. The gas turbine engine of claim 9, wherein the combustor fuel control system is configured to operate in the first fuel delivery mode or the second fuel delivery mode one at a time.

13. The gas turbine engine of claim 12, wherein the combustor fuel control system includes a controller in communication with a non-transitory memory storing instructions, which instructions when executed cause the controller to deliver the first fuel to the plurality of fuel nozzles or deliver the second fuel to the rotary fuel slinger based on a flight segment of an aircraft powered by the gas turbine engine.

14. The gas turbine engine of claim 12, wherein the combustor fuel control system includes a controller in communication with a non-transitory memory storing instructions, which instructions when executed cause the controller to deliver the first fuel to the plurality of fuel nozzles or deliver the second fuel to the rotary fuel slinger based on a gas turbine engine emissions target.

15. The gas turbine engine of claim 12, wherein the combustor fuel control system includes a controller in communication with a non-transitory memory storing instructions, which instructions when executed cause the controller to deliver the first fuel to the plurality of fuel nozzles or deliver the second fuel to the rotary fuel slinger based on one or more flight conditions associated with an aircraft powered by the gas turbine engine.

16. A method of operating a gas turbine engine for an aircraft, the gas turbine engine including a compressor section, an annular combustor, and a turbine section, wherein the annular combustor includes a combustion chamber having an inner radial combustion zone and an outer radial combustion zone, the method comprising:

controlling a flow of gaseous zero-carbon fuel to a plurality of fuel nozzles engaged with the outer radial combustion zone of the combustion chamber; and controlling a flow of liquid aviation fuel to a rotary fuel slinger engaged with the inner radial combustion zone of the combustion chamber;

wherein the step of controlling the flow of gaseous zero-carbon fuel and the step of controlling the flow of liquid aviation fuel are coordinated based on one or more sensed flight conditions associated with the aircraft powered by the gas turbine engine, wherein the flow of gaseous zero-carbon fuel is provided to the plurality of fuel nozzles when the one or more sensed flight conditions are favorable to combustion of the gaseous zero-carbon fuel, and the flow of liquid aviation fuel is provided to the rotary fuel slinger when the one or more sensed flight conditions are favorable to combustion of the liquid aviation fuel.

17. The method of claim 16, wherein the coordination of the step of controlling the flow of gaseous zero-carbon fuel and the step of controlling the flow of liquid aviation fuel are based on a flight segment of the aircraft powered by the gas turbine engine.

18. The method of claim 16, wherein the coordination of the step of controlling the flow of gaseous zero-carbon fuel and the step of controlling the flow of liquid aviation fuel are based on a gas turbine engine emissions target.

* * * * *